United States Patent
Rao et al.

(10) Patent No.: US 6,727,052 B1
(45) Date of Patent: Apr. 27, 2004

(54) MULTILAYER PHOTOGRAPHIC FILM AND AN IMAGING ELEMENT MADE OF SAID BASE

(75) Inventors: YuanQiao Rao, Rochester, NY (US); Jehuda Greener, Rochester, NY (US); Robert H. Fehnel, Rochester, NY (US); Michael R. Brickey, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/327,365

(22) Filed: Dec. 20, 2002

(51) Int. Cl.⁷ .......................... G03C 1/795; G03C 1/93; B32B 27/06; B32B 27/36; B29C 55/00
(52) U.S. Cl. .................. 430/496; 430/494; 430/533; 264/173.15; 264/173.16; 264/210.7; 428/480
(58) Field of Search ................. 430/535, 496, 430/494; 428/480; 264/173.15, 173.16, 210.7

(56) References Cited

U.S. PATENT DOCUMENTS

| | | | | |
|---|---|---|---|---|
| 6,468,726 B2 | * | 10/2002 | Haraoka et al. | 430/533 |
| 6,555,303 B1 | * | 4/2003 | Rao et al. | 430/533 |
| 6,558,884 B1 | * | 5/2003 | Greener et al. | 430/533 |

* cited by examiner

*Primary Examiner*—Richard L. Schilling
(74) *Attorney, Agent, or Firm*—Chris P. Konkol

(57) ABSTRACT

This invention relates to a PET-based photographic multilayer film base having improved properties with regard to cutting, stiffness and post-process curl. In particular, the polyester film base comprises a biaxially-stretched multilayer film structure, in which layers a specified amount of monomeric units derived from 1,4-cyclohexanedimethanol (CHDM), sulfonic-acid-substituted aromatic dicarboxylic acid and poly(alkylene glycol) is present.

26 Claims, No Drawings

MULTILAYER PHOTOGRAPHIC FILM AND AN IMAGING ELEMENT MADE OF SAID BASE

RELATED APPLICATIONS

This application is related to copending, commonly assigned applications U.S. Ser. No. 10/325,386, U.S. Ser. No. 10/327,373 U.S. Ser. No. 10/036,668, and U.S. Ser. No. 10/027,023, hereby all incorported by reference in their entirety.

FIELD OF THE INVENTION

This invention relates to a PET-based polyester film base material comprising repeat units derived from 1,4-cyclohexane dimethanol, a sulfonic-acid-substituted aromatic dicarboxylic acid, and a polyalkylene glycol. The film base made from said material has good cutting-related properties and post-process curl characteristics in photographic film applications.

BACKGROUND OF THE INVENTION

Silver-halide photographic elements comprise one or more light-sensitive layers coated on a support. Typically the support comprises a sheet of a transparent or translucent film, commonly referred to as a film base. Other layers, such as backing or subbing layers, may be laminated onto either side of the film base. Common film-base materials for photographic elements are cellulose triacetate (CTA) and poly(ethylene terephthalate) (PET). More recently it has been proposed to use poly(ethylene naphthalate) (PEN) as a film base for photographic elements which are intended for use in a cartridge of reduced diameter requiring rolling the film more tightly than previously.

CTA has generally a good mix of physical properties for various types of photographic films. However, its manufacturing process involves high levels of gaseous emissions, and it is relatively costly. The manufacturing process for PET film base, on the other hand, is environmentally benign. PET films exhibit excellent properties for use as photographic film base with regard to transparency, dimensional stability, mechanical strength, and resistance to thermal deformation. However, compared to CTA, PET films are extremely tough and, therefore, not well suited for finishing operations, i.e., slitting, chopping and/or perforating processes, which are required in the manufacture or preparation of photographic films. Moreover, such films are difficult to cut in various steps of the photofinishing process such as splicing, notching, and sleeving. This is one of the reasons for PET materials being considered unusable as a film base in certain consumer photographic film applications, such as 35 mm film, especially consumer films requiring non-centralized external processing or mini-lab processing where finishing must be easily handled. PET materials are presently used in photographic films which are not wound tightly around a small core and in which decentralized processing is not required, for example, X-ray films, motion picture films, and graphic arts films. With respect to the latter types of films, adjustments to processing can be more easily made to handle cutting and the like.

Another general problem with PET film base is its tendency to take up high levels of curl during storage in cartridges at high temperatures and its inability to sufficiently lower this curl during photoprocessing as commonly exhibited by CTA-based photographic films. A solution to the latter problem was proposed in U.S. Pat. No. 5,556,739 to Nakanishi et al., U.S. Pat. No. 5,387,501 to Yajima et al., and U.S. Pat. No. 5,288,601 to Greener et al. in which multilayered supports comprising polyesters modified by sulfonate and other hydrophilic moieties to facilitate, in wet processing, recovery of curl imposed on the film during storage in a cartridge. Another general approach to lowering the tendency of a polyester film base to take up curl (core-set) during storage is through annealing at elevated temperature and/or by raising the glass transition temperature (Tg) of the polyester but these approaches may be expensive to implement in film manufacturing.

U.S. Pat. No. 3,326,689 to Murayama discloses glow discharge treatment for improved curl of a film base made from a polyester material, preferably a PEN material. In one case, the polyester material comprises a PET-based material in which 25 mol % of the glycol repeat units are derived from 1,4-cyclohexane dimethanol (CHDM). U.S. Pat. No. 5,294,473 to Kawamoto similarly discloses a PET polyester film base in which 25 mol % of the glycol component repeat units are derived from CHDM, with improved (reduced) curl.

U.S. Pat. No. 5,925,507 to Massa et al. discloses a PET film base material having less tendency to core set, comprising polyester containing at least 30 weight % CHDM, which polyester is blended with a polycarbonate that contains bisphenol. U.S. Pat. No. 4,141,735 to Schrader et al. discloses a polyester film base having improved core-set curl, involving the use of heat tempering, in one example using poly(1,4-cyclohexylene dimethylene terephthalate). However, this polymer crystallizes rapidly, therefore the making of its oriented film is difficult. Also, the polymer becomes opaque or hazy and useless for photographic applications where transparency is required.

The use of high heat-set temperature during the film-base manufacturing process has also been used to improve the finishability of PET-based photographic film. However, even with the demonstrated improvements in finishability, the PET-based film is still difficult to cut in various steps of the photofinishing process. U.S. Pat. No. 5,034,263 to Maier et al. discloses a laminated film comprising a PET core and, on at least one surface thereof, a layer of a poly(4-cyclohexylene dimethylene terephthalate) polyester, in order to allow the laminated film to be readily slit and perforated using techniques commonly employed with consumer film. Maier et al. states that the CHDM component should comprise at least 70 mol % of the glycol component of the polyester. However, such laminates have been found prone to delamination.

The blending or copolymerizing of conventional polyester with other polyester constituents (polymers or comonomers), in order to improve the cutting performance of a film, has also been proposed for PEN-based polyester films, as disclosed in U.S. Pat. No. 6,232,054 B1 to Okutu et al. However, PEN is generally considerably more costly and more difficult to manufacture than PET, so a clear need exists for improving the cuttability of PET-based polyester supports.

Outside the photographic field, PET and PEN are valuable commercial semicrystalline polyesters, which are widely used for packaging materials due to the combination of desirable properties that they possess. The high oxygen barrier properties of these polyesters render them particularly valuable for packaging oxygen-sensitive food and other goods and materials. PEN has advantages over PET due to its higher Tg and higher oxygen barrier properties, although PEN, as mentioned above, is considerably more costly and is somewhat harder to process than PET.

The toughness and cutting difficulty of PET and similar polyesters is generally attributed to the crystal structure and molecular orientation of the film. It is known that changes in these factors, driven either by formulary changes or by modified process conditions, can be used to lower the toughness and improve the cutting performance of PET. Generally, the crystallinity of PET can be lowered or altogether eliminated by adding suitable crystallization modifiers. Crystallization modifiers like isophthalic acid (IPA) and CHDM are often copolymerized into PET and PEN polyesters to form copolyesters that have better processing properties. Modest levels of IPA slow down crystallization and raise the oxygen barrier properties. Higher levels of IPA break up crystallinity and lead to amorphous copolyesters with good barrier properties, but these copolyesters, are known to those skilled in the art to possess poor impact and other mechanical properties. Modest levels of CHDM also slow down crystallization, but decrease oxygen barrier properties. Higher levels of CHDM are well known to form families of amorphous copolyesters, which are widely used in commerce in a multitude of applications including heavy gauge sheet, signage, medical packages, etc. These copolyesters have excellent impact resistance and other mechanical properties, but have lower oxygen barrier properties than IPA-modified copolyesters and lower oxygen barrier properties than PET.

Amorphous copolyesters are generally defined as copolyesters that do not show a substantial melting point by differential scanning calorimetry. These copolyesters are typically based on terephthalic acid (TPA), IPA, ethylene glycol (EG), neopentyl glycol and CHDM. It is known that amorphous copolyesters possess a combination of desirable properties, such as excellent clarity and color, toughness, chemicalfresistance and ease of processing. Accordingly, such copolyesters are known to be useful for the manufacture of extruded sheets, packaging materials, and parts for medical devices. For example, U.S. Pat. Nos. 5,385,773 and 5,340,907 to Yau et al. disclose polyesters containing CHDM, in an amount of 10–95 mol % of the glycol component, and a process for producing such copolymers by esterification. U.S. Pat. No. 6,183,848 B1 to Turner et al. discloses amorphous copolyesters comprising various amounts of comonomers derived from CHDM which, because of improved gas barrier properties, are useful for packaging of perishable goods. In one embodiment, the copolyester is disclosed as a biaxially oriented sheet. Film and sheet made from various amorphous PET-based polyesters comprising repeat units from CHDM are sold by Eastman Chemical Company under the trademarks EASTAPAK and EASTAR copolyesters.

U.S. Pat. No. 5,387,501 to Yajima et al. discloses a multilayer polyester with CHDM in only one layer not containing sulfonate moiety. The level of CHDM is not specified. In a preferred embodiment, the CHDM is incorporated in a layer nearer to the imaging layer.

U.S. Pat. No. 5,759,756 to Laney et al. discloses a multilayer film base with no sulfonate moieties and with CHDM being incorporated only in the core layer, which is said to be non-crystalline.

WO 01/34391 to Moskala et al. discloses a multilayer film for packaging applications containing CHDM in one or more layers but said layers do not contain sulfonate moiety. CHDM may be present in both the core and the outer layers, but, in preferred embodiments, PET is placed in the core layer and a thin, amorphous, CHDM-containing amorphous polyester is coated as a thin outer layer. A preferred composition of the outer layer is 31 mol % CHDM of total glycol content, which renders the modified PET amorphous.

U.S. Pat. No. 5,288,601 to Greener et al. discloses a multilayer photographic film base with the outer layer containing a polyester modified with a sulfonate moiety. Although the possibility of using CHDM is mentioned it is not considered for use in the layer containing the sulfonated polyester. In a preferred embodiment the sulfonate-containing polyester is on the side of the emulsion layer. U.S. Pat. No. 5,556,739 to Nakanishi et al. is directed to the use of polyesters containing sodiosulfo isophthalate (SIP) in both layers with a difference of not more than 5.5 mol % based on total acid content between the layers. In addition, Nakanishi et al. mentions the possibility of having SIP in both layers with CHDM, but no examples or levels are provided. There is no teaching of CHDM in both the core and outer layer.

U.S. Pat. No. 5,631,124 to Ikuhara et al. discloses a PEN polyester with a relatively high Tg. Ikuhara's multilayer film base does not employ SIP and CHDM in the same layer and does not employ CHDM in both the core and the outer layers.

PROBLEM TO BE SOLVED BY THE INVENTION

Accordingly, it would be desirable to provide a PET-based polyester film base with improved physical properties. In particular, it would be desirable to obtain a PET-based polyester film base that is less tough and better suited for finishing operations, i.e., slitting, chopping and perforating processes, which are required in the preparation of photographic films. Moreover, it would be desirable to obtain a PET-based polyester film base that is easier to cut in various steps of the photofinishing process, such as splicing, notching, and sleeving. Additionally, it would be desirable to be able to use PET-based polyester as a film base in certain consumer photographic film applications and in films processed in a minilab setting. It would also be desirable for such a PET-based polyester film base to have other advantageous properties such as improved dimensional stability and a propensity to reduce curl during photo-processing.

SUMMARY OF THE INVENTION

As indicated above, this invention relates to a multilayer PET-based polyester film base material comprising repeat units derived from 1,4-cyclohexane dimethanol (CHDM), a sulfonic-acid-substituted aromatic dicarboxylate and a polyalkylene glycol (PEG).

The desired level of CHDM in the film base can be obtained either by the addition/blending of polyester polymers containing CHDM monomeric units to PET-based material and/or the synthetic incorporation of CHDM monomer units into a PET-based polyester backbone at appropriate levels. Furthermore, the film base comprises a multilayer structure, wherein a specified amount of monomeric units derived from sulfonic acid-substituted aromatic dicarboxylate, e.g., sodiosulfoisophthalate (SIP), and PEG is used in one or more outer layers, such that the multilayer film base has a specified curl-related property. This invention provides an improved PET-based polyester multilayer film base for photographic film or other imaging elements, having excellent dimensional stability, optical clarity and mechanical strength while also possessing an improved cuttability and curl characteristics.

A further embodiment of the invention is directed towards a photographic element comprising at least one light sensitive silver halide-containing emulsion layer and a PET-based polyester multilayer film base produced in accordance with the above embodiments.

Definitions of terms, used herein, include the following:

Monomeric units derived from 1,4cyclohexane dimethanol (CHDM) are also referred to as "CHDM repeat units" or "CHDM comonomer units."

By "terephthalic acid" or "WTA," suitable synthetic equivalents, such as dimethyl terephthalate, are included. It should be understood that "dicarboxylic acids" of any type, not only TPA, includes the corresponding acid anhydrides, esters and acid chlorides for these acids. The total levels of glycol or acid components in a polyester or material of this invention are equal to a total of 100 mol %.

"PET," "PET polymer," "PET resin," "poly(ethylene terephthalate) resin," and the like refers to a polyester comprising at least 98 mol % terephthalic acid comonomer units, based on the total acid component, and comprising at least 98 mol % of ethylene glycol comonomer units, based on the total glycol component. This includes PET resins consisting essentially of about 100 mol % terephthalic acid comonomer units, based on the total acid component, and consisting essentially of about 100 mol % of ethylene glycol comonomer units, based on the total glycol component.

The term "modified PET polymer," "modified PET resin," or the like is a polyester comprising at least 70 mol % terephthalic acid comonomer units, based on the total acid component, that has been modified so that either the acid component is less than 98 mol % of terephthalic acid (TPA) comonomer units or the glycol component is less than 98 mol % of ethylene glycol (EG) comonomer units, or both the EG and TPA comonomer units are in an amount less than 98 mol %. The modified PET polymer is modified with, or copolymerized with, one or more comonomers,other than terephthalic acid comonomers and/or ethylene glycol comonomers in an amount of greater than 2 mol % (including greater than 5 mol %), of either the acid component and/or the glycol component, for example, to improve the cuttability of a film base or otherwise change the properties of the film base in which it is used. The "modified PET resin" does not necessarily need to contain any ethylene glycol comonomer units, and it does not necessarily need to contain any acid component other than terephthalic acid comonomer units.

In one embodiment, the "modified PET polymer" is a polyester comprising at least 80 mol % terephthalic acid comonomer units, based on the total acid component, and at least 60 mol % EG comonomer units, further modified with or copolymerized with one or more additional types of comonomers, preferably in the amount of greater than 5 mol % of the acid component and/or glycol component.

The term "CHDM-modified PET" or "CHDM-modified PET polyester" refers to a "modified PET polymer" modified by the inclusion of at least 2 mol % (including at least 3.5 mol %) of CHDM comonomer units.

Similarly, the term "CHDM-modified polyester" refers to a polyester comprising at least 2 mol % (including at least 3.5 mol %) CHDM-comonomer units, based on total glycol component, but not necessarily comprising any specific amount of terephthalic acid component.

"PET-based polyester material" is a semicrystalline material comprising one or more polymers wherein at least 70% by weight of the material is one or more polymers that are either a PET polymer or a modified PET polymer. Optionally, the material may also include addenda such as silica particles, beads, plasticizers, and the like.

A film base is made using a PET-based polyester material in the present invention. In one embodiment, preferably greater than 80% by weight, more preferably greater than 90% by weight, of the PET-based polyester material used in this invention are one or more polymers that are either a PET polymer or a modified PET polymer.

DETAILED DESCRIPTION OF THE INVENTION

As indicated above, the present invention relates to an imaging element comprising at least one light-sensitive or heat-sensitive imaging layer over a support that comprises a biaxially stretched, semicrystalline multilayer film base comprising at least two layers. The multilayer film can be manufactured with conventional multilayer sheet-forming co-extrusion and biaxial stretching film-forrning techniques, well known to the skilled artisan. The main layer is made of a first PET-based polyester material comprising one or more polyester resins, optionally comprising repeat units derived from CHDM. Adjacent on at least one side of the main layer is an outer layer. The multilayer film can be a two-layer or a three-layer film, not including any tie layers. Additional layers can be added. In a two-layer film, the main layer is nearer than the outer layer to said imaging layer. The outer layer comprising a second PET-based polyester material comprising one or more polyester resins, in which material the total level of repeat units derived from CHDM is 2 to 100 mol % based on the total glycol component, the total level of repeat units derived from poly(alkylene glycol) is 3 to 10 wt % based on the total polyester material, the total level of repeat units derived from a salt of a sulfonic-acid-substituted aromatic dicarboxylate is 2 to 10 mol % based on the total acid component in the material. At least the polyester material in the outer layer is semi-crystalline.

In the multilayer film base of the present invention, the total thickness of the film base is 50 to 180 μm and the ratio of the thickness of the main layer to the sum of the other layers is from 0.5 to 10, more preferably from 0.7 to 5 and most preferably from 1 to 3. The cutting index, as defined below, of said multilayer film base is less than 4.2.

In one embodiment of the invention, the multilayer photographic film base, having at least two layers, where the main layer is PET-based polyester and the outer layer comprises CHDM in the range of 2 to 100 mol % of total glycol content, PEG in the range of 3 to 10 wt % of the total polyester material, and SIP (sodiosulfo isophthalate) in the range of 2 to 10 mol % of the total acid component.

In a preferred embodiment, there is less than 50 mol % difference in the level of CHDM between the main layer and each of the outer layers and/or there is a tie layer of less than 20 μm in thickness, preferably less than 10 μm, separating the main layer and the outer layer. The tie layer provides a desired interlayer adhesion with peel strength being of at least twice the peel strength of the film in the absence of the tie layer, preferably at least 20 Newtons/meter. The above-mentioned main layer and outer layers or the like, can be referred to as "support layers," to distinguish these layers from tie layers. Typically, a support layer contributes to the cutting properties and rigidity of the film base and is usually thicker than an adjacent tie layer. The thickness of a support layer is, typically, greater than 10 μm, preferably greater than 20 μm.

In another embodiment of the present invention, the multilayer photographic film base has at least three layers, including a main layer that is a PET-based polyester and first and second outer layers both of which are adjacent to the main layer and independently comprise: CHDM in the range of 2 to 100 mol % of total glycol component, poly(alkylene glycol) in the range of 3 to 10 wt % based on the total polyester material and a salt of a sulfonic-acid-substituted aromatic dicarboxylate in the range of 2 to 10 mol % based on the total acid component.

Accordingly, an imaging element according to the present invention comprises at least one light-sensitive or heat-sensitive imaging layer over a support comprising a biaxially stretched, semicrystalline multilayer film base comprising at least three layers, including a main layer of a first PET-based polyester material; and on both sides of the main layer, first and second outer layers of a second and third PET-based polyester material independently comprising one or more polyester resins, in which material: (a) the total level of repeat units derived from CHDM is 2 to 100 mol %, based on the total glycol component in the material; (b) the total level of repeat units that are a salt of a sulfonic-acid-substituted aromatic dicarboxylate is between 2 and 10 mol % based on the total acid component in the material; and (c) the total level of repeat units that is a poly(alkylene glycol) having an average molecular weight of 300 to 20000 is between 3 and 10 wt % of the total polyester material. The second and third polyester materials can be the same or different, preferably the same. In this embodiment, there is preferably less than a 50 mol % difference in CHDM between the main layer and each of the outer layers and/or there is a tie layer of less than 10 μm in thickness separating the main layer and each of the outer layers to improve adhesion between said layers.

In the case of a film base having only two layers, the main layer is preferably nearer than the outer layer to the imaging layer and at least the polyester material in the outer layer is semicrystalline.

In still another embodiment, the first PET-based polyester material comprises one or more polyester resins, in which material the total level of repeat units derived from CHDM is 5 to 10 or 90 to 100 mol %, based on the total glycol component for material in the outer layer.

In another embodiment, the first PET-based polyester material is PET polymer.

In still another embodiment of the invention, the second PET-based polyester material comprises copolymerizedTPA, sulfonated aromatic dicarboxylic acid, CHDM, and polyalkylene glycol; further comprising a glycol selected from the group consisting of ethylene glycol, propylene glycol, butanediol, neopentyl glycol, diethylene glycol and p-xylene glycol, polyalkylene glycols and the like, and combinations thereof; and an aromatic dicarboxylic acid selected from the group consisting of 2,6-naphthalene dicarboxylic acid (NDA), IPA, orthophthalic acid, 1,4-cyclohexane dicarboxylic acid (CHDA), paraphenylene dicarboxylic acid (PPDA) and the like, and combinations thereof.

The aromatic dibasic acids and glycols described above may have one or more substituents. As the above copolymerized polyester, preferred is copolymerized PET comprising TPA and EG as main constitutional components.

As the aromatic dicarboxylic acid having a metal sulfonate group, there may be used 5-sodium sulfoisophthalic acid, 2-sodium sulfoisophthalic acid, 4-sodium sulfoisophthalic acid, 4-sodium sulfo-2,6naphthalene dicarboxylic acid, or ester-forming derivatives shown below:

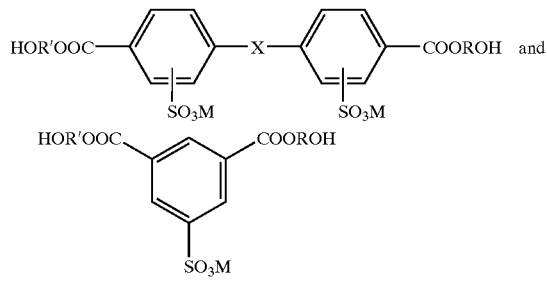

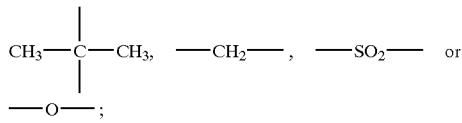

wherein X represents:

$$CH_3-\underset{|}{\overset{|}{C}}-CH_3,\ \ -CH_2-,\ \ -SO_2-\ \ \text{or}$$

$$-O-;$$

R and R' each represent —(CH$_2$)$_n$— where n represents an integer of 1 to 20; and a compound in which each of these sodium atoms is substituted by another metal (e.g. potassium and lithium).

In the second PET-based polyester, or independently in the second or third PE-based polyesters, the amount of the copolymer component comprising the aromatic dicarboxylic acid having a metal sulfonate group is 2 to 10 mol % based on total acid component. If the amount is less than 2 mol %, sufficient recovery from core-set curl cannot be attained, while if it exceeds 10 mol %, mechanical strength is too low and melt processibility is difficult.

As indicated above, in the copolyester to be used in the outer layer of the present invention, a poly(alkylene glycol) is further contained as a copolymer component in an amount of 3 to 10% by weight based on the total weight of the polyester. If the amount of the poly(alkylene glycol) is less than 3% by weight, sufficient recovery from core-set curl cannot be attained, while if it exceeds 10% by weight, mechanical strength and dimensional stability are poor.

As the poly(alkylene glycol), there may be used PEG, polytetramethylene glycol, and polypropylene glycol, and among them, PEG is preferred. Its number average molecular weight is not particularly limited, but it is preferably 300 to 20,000, more preferably 400 to 6,000.

The copolyesters to be used in the support for an imaging element of the present invention may be further copolymerized with other components or may be blended with other polymers, within the range, which does not impair the effect of the present invention.

The copolyesters to be used in the present invention may be obtained according to a conventionally known method. That is, the copolyesters can be obtained by subjecting an aromatic dibasic acid component and a glycol component to ester interchange, followed by polycondensation at high temperature under reduced pressure. In the preparation, the aromatic dicarboxylic acid having a metal sulfonate group and poly(alkylene glycol), which are copolymer components are preferably added to the ester interchange product and then the polycondensation is carried out.

In one embodiment, the first and/or the second and/or the third (if present) polyester materials comprise a blend of at least two polyesters. For example, the second PET-based polyester material in the outer layer can comprise a blend of at least two polyesters, a first polyester being a high-CHDM-modified PET polyester in which material the level of CHDM comonomer units is above 95 mol %, and a second polyester comprising repeat units derived from CHDM, wherein the total repeat units derived from CHDM in the PET-based polyester material is at a level of 65 to 100 mol % based on the total glycol component in the material.

In particular, the first polyester can comprise 100 mol % of CHDM monomer, based on the total glycol component in the first polyester, and the second polyester is a CHDM-modified-PET polyester, wherein the total repeat units derived from CHDM in the PET-based polyester material is at a level of 65 to 100 mol % based on the total glycol component in the polyester material.

In another embodiment, the first and/or the second and/or (if present) the third polyester material each independently comprise a miscible blend of at least two polyesters. For example, the second PET-based polyester material in the outer layer can be a blend of at least two polyesters, a first polyester that is a PET-based polyester or a modified-PET polyester and a second polyester, the second polyester comprising repeat units derived from CHDM such that the total repeat units derived from CHDM in the polyester material is at a level between 3.5 to 25 mol % based on the total glycol component in the polyester material. Such a blend is desired to be miscible, that is, the blended material must be clear and possess a single glass transition temperature intermediate between the glass transition temperatures of the blended polyesters.

In accordance with one embodiment of the invention, the first and/or second polyester materials are each formed by blending a PET resin with polyester resins containing a sufficient level of CHDM comonomer and/or other moieties described above using a suitable compounding method. The blended materials are then used to prepare a multilayer, biaxially stretched and heat-set film or sheet material under conditions similar to those used for preparing a conventional PET film base.

The PET-based polyesters used in making the articles of this invention preferably have 100 mol % of a dicarboxylic acid portion and 100 mol % of a glycol portion. Less than about 30 mol %, preferably not more than about 20 mol % of the dicarboxylic acid repeat units may be from other conventional acids such as succinic, glutaric, adipic, azaleic, sebacic, fumaric, maleic, itaconic, 1,4-cyclohexane dicarboxylic, phthalic, isophthalic, naphthalene dicarboxylic acid and the like. The glycol component may optionally include less than 35 mol %, preferably not more than about 10 mol % of other conventional glycols such as propylene glycol, 1,3-propanediol; 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 1,8-octanediol, 2,2,4-triethyl-1,6-hexanediol, thiodiethanol, 1,2-cyclohexane dimethanol, 1,3-cyclohexane dimethanol, 2,2,4,4-tetramethyl-1,3-cyclobutanediol, and the like.

In another embodiment, the first and/or the second polyester and/or (in the case of a three-layer film base) third polyester material can each comprise a single polyester polymer rather than a blend of polyesters. The desired composition of the polyester is achieved through the copolymerization of different comonomers. In one embodiment, the copolyester to be used in an outer layer of a multilayer film base of the present invention is a copolyester comprising, as its acid component, comonomers of an aromatic dicarboxylic acid having a metal sulfonate group and TPA and, as its glycol component, CHDM, EG and PEG.

Both the polyester and the copolyester to be used in the support for a photographic element of the present invention may contain phosphoric acid, phosphorous acid and esters thereof, phosphites, and inorganic particles (e.g. silica, kaolin, calcium carbonate, calcium phosphate and titanium dioxide) during polymerization, and/or the inorganic particles may be blended with the polymer after polymerization. The inorganic particles can be larger than, but may have a size in at least one dimension ranging from 0.1 to 100 nm. A dye, a UV absorber or an antioxidant may also be added at any stage of the polymerization process and/or after polymerization.

Photographic film requires a strict control of the thickness uniformity and surface flatness. One method of control is through stretching of a polymer sheet into a semicrystalline state. For CHDM-modified polyester, only when the concentration of CHDM comonomer units relative to the total glycol content is less than about 30 mol % or greater than about 65 mol % is the resulting polyester crystalline. For materials in which the content is less than about 30 mol %, however, the material does not become sufficiently crystalline for dimensional stability and thickness uniformity until the concentration of CHDM comonomer relative to total glycol content is less than 25 mol %. Amorphous polyester film or insufficiently crystalline film presents dimensional stability and thickness uniformity problems, and it possesses relatively low stiffness.

As indicated above, the multilayer film base is useful in a photographic element comprising at least one silver-halide imaging layer over a support comprising a multilayer film base. Such a photographic element can be a photographic film or a photothermographic film.

In addition to the PET-based multilayer film base according to the present invention, the support can further comprise one or more photographically acceptable subbing layers, backing layers, tie layers, magnetic layers and the like.

Subbing layers are used for the purpose of providing an adhesive force between the polyester support and an overlying photographic emulsion comprising a binder such as gelatin, because a polyester film is of a very strongly hydrophobic nature and the emulsion is a hydrophilic colloid. If the adhesion between the photographic layers and the support is insufficient, several practical problems arise such as delamination of the photographic layers from the support at the cut edges of the photographic material, which can generate many small fragments of chipped-off emulsion layers, which then cause spot defects in the imaging areas of the photographic material.

Various subbing processes and materials have, therefore, been used or proposed in order to produce improved adhesion between the support film and the hydrophilic colloid layer. For example, a photographic support may be initially treated with an adhesion promoting agent such as, for example, one containing at least one of resorcinol, catechol, pyrogallol, 1-naphthol, 2,4-dinitro-phenol, 2,4,6-trinitrophenol, 4-chlororesorcinol, 2,4-dihydroxy toluene, 1,3-naphthalenediol, 1,6-naphthalenediol, acrylic acid, sodium salt of 1-naphthol-4-sulfonic acid, benzyl alcohol, trichloroacetic acid, dichloroacetic acid, o-hydroxybenzotrifluoride, m-hydroxybenzotrifluoride, o-fluorophenol, m-fluorophenol, p-fluorophenol, chloralhydrate, and p-chloro-m-cresol. Polymers are also known and used in what is referred to as a subbing layer for promoting adhesion between a support and an emulsion layer. Examples of suitable polymers for this purpose are disclosed in U.S. Pat. Nos. 2,627,088; 2,968,241; 2,764,520; 2,864,755; 2,864,756; 2,972,534; 3,057,792; 3,071,466; 3,072,483; 3,143,421; 3,145,105; 3,145,242; 3,360,448; 3,376,208; 3,462,335; 3,475,193; 3,501,301; 3,944,699;

4,087,574; 4,098,952; 4,363,872; 4,394,442; 4,689,359; 4,857,396; British Patent Nos. 788,365; 804,005; 891,469; and European Patent No. 035,614. Often these include polymers of monomers having polar groups in the molecule such as carboxyl, carbonyl, hydroxy, sulfo, amino, amido, epoxy or acid anhydride groups, for example, acrylic acid, sodium acrylate, methacrylic acid, itaconic acid, crotonic acid, sorbic acid, itaconic anhydride, maleic anhydride, cinnamic acid, methyl vinyl ketone, hydroxyethyl acrylate, hydroxyethyl methacrylate, hydroxychloropropyl methacrylate, hydroxybutyl acrylate, vinylsulfonic acid, potassium vinylbenezensulfonate, acrylamide, N-methylamide, N-methylacrylamide, acryloylmorpholine, dimethylmethacrylamide, N-t-butylacrylamide, diacetonacrylamide, vinylpyrrolidone, glycidyl acrylate, or glycidylmethacrylate, or copolymers of the above monomers with other copolymerizable monomers. Additional examples are polymers of, for example, acrylic acid esters such as ethyl acrylate or butyl acrylate, methacrylic acid esters such as methyl methacrylate or ethyl methacrylate or copolymers of these monomers with other vinylic monomers; or copolymers of polycarboxylic acids such as itaconic acid, itaconic anhydride, maleic acid or maleic anhydride with vinylic monomers such as styrene, vinyl chloride, vinylidene chloride or butadiene, or trimers of these monomers with other ethylenically unsaturated monomers. Materials used in adhesion-promoting layers often comprise a copolymer containing a chloride group such as vinylidene chloride.

The composition of the PET-based polyester materials comprising the multilayer film base of the present invention can be prepared by conventional processes. In general, as is well known by the skilled artisan, polyesters comprise the reaction product of at least one dicarboxylic acid and at least one glycol component. The dicarboxylic acid component can typically comprise residues of terephthalic acid, isophthalic acid, 1,4-cyclohexanedicarboxylic acid, 2,6-naphthalenedicarboxylic acid, and/or mixtures thereof Also suitable are the anhydrides thereof, acid chlorides thereof, and lower, e.g., C1–C8 alkyl esters thereof Any isomers of the dicarboxylic acid component or mixtures thereof may be used. For example, cis, trans, or cis/trans mixtures of 1,4-cyclohexanedicarboxylic acid may be employed. Examples of suitable naphthalene dicarboxylic acid isomers include 1,4-naphthalene dicarboxylic acid, 2,6-naphthalene dicarboxylic acid, 2,7-naphthalene dicarboxylic acid or mixtures thereof.

The polyester used in the present invention can be prepared by a process comprising reacting the dicarboxylic acid component and the glycol component at temperatures sufficient to effect esterification or ester exchange and polycondensing the reaction product under an absolute pressure of less than 10 mm Hg for a time of less than about 2 hours in the presence of a catalyst and inhibitor system. An example of a preferred catalyst and inhibitor system is about 0–150 ppm Mn, about 0–150 ppm Zn, about 0–300 Sb, about 0–200 ppm Ge, about 0–100 ppm Ti, 0–1000 ppm Na in addition to metal in the SIP, and about 0–150 ppm P, all parts by weight based on the weight of the polyester.

Either dimethyl terephthalate (or other lower dialkyl terephthalate ester) or terephthalic acid can be used in producing the copolyester. Thus, the term "terephthalic acid component, monomer, repeat unit, or portion" herein is meant to include either the acid or ester form. These materials are commercially available. The glycols CHDM and ethylene glycol are also commercially available. Either the cis or trans isomer of CHDM, or mixture thereof, may be used in accordance with the present invention.

Generally, the copolyesters may be produced using conventional polyesterification procedures described, for example, in U.S. Pat. Nos. 3,305,604 and 2,901,460, the disclosures of which are incorporated herein by reference. The amorphous or semi-crystalline copolyesters according to the invention are prepared by conventional polymerization processes known in the art, such as disclosed by U.S. Pat. Nos. 4,093,603 and 5,681,918, the disclosures of which are herein incorporated by reference. Examples of polycondensation processes useful in making the PET material of the present invention include melt phase processes conducted with the introduction of an inert gas stream, such as nitrogen, to shift the equilibrium and advance to high molecular weight or the more conventional vacuum melt phase polycondensations, at temperatures ranging from about 240° C. to about 300° C. or higher which are practiced commercially. Although not required, conventional additives may be added to the copolyester materials of the invention in typical amounts. Such additives include pigments, colorants, stabilizers, antioxidants, extrusion aids, slip agents, carbon black, flame-retardants and mixtures thereof.

Various modified-PET polyesters comprising repeat units from CHDM, which can be used in the present invention, are commercially available from Eastman Chemical Company (Kingsport, Tenn.) under the trademark EASTAPAK and EASTAR copolyester, as described at http://www.eastrnan.com.

Photographic elements of this invention can have the structures and components shown in Research Disclosure Item 37038 and can be imagewise exposed and processed using known techniques and compositions, including those described in the Research Disclosure Item 37038 cited above.

The multilayer film base may be manufactured by a process of multilayer sheet co-extrusion, casting, biaxial stretching and heat-setting. The process for malting polyester multilayer film base typically comprises the steps of casting molten polyester resins through a specialized multilayer sheet-forming co-extrusion die onto a casting surface along the machine direction to form a continuous sheet, drafting the sheet by stretching in the machine direction, tentering the sheet by stretching in the transverse direction, heat-setting the drafted and tentered sheet, and cooling the heat-set sheet to form a stretched, heat-set polyester film, such as described in, e.g., U.S. Pat. No. 4,141,735 to Schrader et al., the disclosure of which is incorporated in its entirety by reference herein. Alternately, the stretching of the film in the machine and transverse directions can be performed simultaneously using appropriate machinery.

In one particular embodiment, the process for preparing films from the resin compositions of this invention comprises the following steps:

(1) The resins are fed by two plasticating extruders into a multi-manifold co-extrusion sheet-forming die and are cast under molten conditions onto a cooling surface to form a continuous cast sheet. Preferably, the molten polyester resins have an inherent viscosity of from 0.5 to 0.8 dl/g, and are cast at temperatures of from 250 to 310° C. while the casting surface has a temperature of from 40 to 70° C. The inherent viscosity (IV) is measured at 25° C. in a solvent mixture of phenol/chlorobenzene (60/40 by weight) at a concentration of 0.25 g/dl with an Ubbelhode glass viscometer.

(2) The continuous sheet is removed from the casting surface and passed into a drafting zone where it is first preheated and then stretched in the machine direction at a stretch ratio of 2.0 to 4.0, at a temperature of from about 80° C. to 110° C. The drafting zone typically includes two sets of nipped rollers, the first being the entrance to the drafting zone and the second the exit from the drafting zone. To achieve the stretch ratios necessary for the practice of this invention, the exit nip rollers are rotated at a speed greater than the entrance nip rollers. The film may be cooled in the last stage of the drafting zone to 25° C. to 40° C.

(3) The film moves from the drafting zone into a tentering zone where it is preheated and stretched in the transverse direction at a stretch ratio of 2.0 to 4.0, at a temperature of from about 80° C. to 115° C. The tentering zone typically includes a means for engaging the film at its edges and stretching such that the final width is from 2.0 to 4.0 times that of the original width.

(4) The film is next heat-set by maintaining it at a temperature of at least 200° C., but below the melting point of the resin having the lowest melting transition in the multilayer sheet, preferably at least 200° C. to 240° C., while being constrained as in the tentering zone for a time sufficient to affect heat-setting. Times longer than necessary to bring about this result are not detrimental to the film; however, longer times are undesired as the lengthening of the zone requires higher capital expenditure without achieving additional advantage. The heat-setting step is typically accomplished within a time period of 0.1 to 15 seconds and preferably 0.1 to 10 seconds. Finally, the film is cooled without substantial detentering (the means for holding the edges of the film do not permit greater than 2% shrinkage thereof).

In many roll film applications, such as in 35 mm photography, the film is typically wound around a small diameter spool in a standard cartridge and stored in a wound state for long times. Such a winding step produces high levels of core-set curl in the film, which can be detrimental to the efficacy and quality of the photofinishing operation. With standard CTA-based films, the high curl acquired during film storage is substantially reduced during photoprocessing due to the capacity of the CTA base to absorb significant amount of moisture during the process. However, with standard PET-based supports such a reduction in curl is not possible. The addition of hydrophilic moieties such as SIP and PEG to the polyester material in the outer layers of the multilayer base structure of the present invention imparts to the base a capacity to absorb moisture during photoprocessing and thereby attain relatively low levels of post-process curl (PPC). It is generally desired that the PPC be as low as possible (no higher than 85 1/m) in order to perform acceptably in the post-process steps of the photofinishing flow. PPC can be measured by first winding the film on a standard-sized spool under certain conditions to simulate long storage times and then unwind the film and immerse the curled film in a warm water bath under conditions typical of standard photo-processing. Alternatively, the curled film can be processed in a standard minilab processor. The curl of the film after processing or PPC can be measured, e.g., in accordance with Test Method A in ANSI P41.29-1985.

With regard to cuttability, it is generally known in the art of sheet material cutting that the cutting process combines crack formation and propagation. To form a crack, one needs to apply cutters to cause tension on the surfaces of the sheet material until the material is deformed and its break point is reached. Once the material's break point is reached, a crack would be formed, which starts the second stage of cutting—crack propagation. One can maintain and eventually complete the cutting process by compressing the sheet material further using the cutters. Eventually, the cutting would be completed as the crack(s) propagates throughout the sheet thickness.

To evaluate the cuttability of a given material, one needs to evaluate how the material behaves during the crack formation and propagation stages. If the material absorbs and dissipates more mechanical energy during the crack formation and propagation processes, it is said to be more difficult to cut and will have a lower cuttability. Two standard tests can be used to evaluate how much mechanical energy a material absorbs and dissipates during the said crack formation and propagation steps. One is the tensile test (ASTM D882) and the other is the tear test (ASTM D 1938). The former can be used to evaluate the crack formation part of the cutting process, and the latter can be used to assess the crack propagation part of the cutting process.

The mechanical and cutting properties of the polyester films of the present invention were evaluated in accordance with the following procedures:

Tensile toughness: This property can be determined using a tensile test such as that described in ASTM D882-80a. A tensile test consists of pulling a sample of material with a tensile load at a specified rate until it breaks. The test sample used may have a circular or a rectangular cross section. From the load and elongation history, a stress-strain curve is obtained with the strain being plotted on the x-axis and stress on the y-axis. The tensile toughness is a measure of the ability of a material to absorb energy in a tensile deformation. Tensile toughness is a fundamental mechanical property of the material.

Tear Strength: The resistance to tear can be determined using a tear test such as that described in ASTM D1938. The test measures the force to propagate tearing in a fracture mode III. The test sample used has a rectangular shape and a sharp long cut in the middle. The separated two arms are then fixed in a conventional testing machine. The fixtures move at constant speed to prolong the preexisting cut and the steady state force of tearing is recorded.

Cutting Index: It is generally known that tensile toughness represents the energy required to initiate a crack, while fracture toughness determines the energy needed to further propagate the crack. As typical cutting processes involve both crack initiation and crack propagation, a quantity of cuttability can be defined based on these two fundamental material quantities. Tensile toughness can be evaluated through tensile testing. Fracture toughness $G_c$ can be calculated from the tear strength:

$$G_c = 2P_c/b \quad (1)$$

where $P_c$ is the load at tear crack growth and b is the specimen thickness. (See Rivlin, R. S. & Thomas, A. G., (1953), J. Polym. Sci., 10, 291).

For practical simplicity, a dimensionless quantity of cutting index is defined as follows, $$C = 0.5*W_t/W_{tr} + 0.5*G_c/G_{cr} \quad (2)$$

where C is the cutting index, $W_t$ is tensile toughness and $G_c$ is fracture toughness, and $W_{tr}$ and $G_{cr}$ are the corresponding properties of a reference material, where CTA is selected as the reference material of this invention. The cutting indices of commonly used film base materials such as PET, PEN and CTA correspond well to their practical cutting performance. Generally, it is desirable for C to be close to 1 (CTA value).

The polyester films having the properties set forth above and prepared by the process described above are less likely to fail and more likely to produce cleaner cut surfaces in various cutting operations. In fact, the films prepared in accordance with this invention compare favorably with CTA, which has been the traditional film base of choice in the photographic industry because of its special physical characteristics.

The present invention is described in greater detail below by referring to the Examples. However, the present invention should not be construed as being limited thereto.

EXAMPLES

Materials:

The poly(ethylene terephthalate) (PET)-based supports in the following examples were prepared using the following materials:

Polyester-1 (P-1): EASTAPAK PET Polyester 7352 (Trademark of Eastman Chemical Company, USA) is a PET resin.

Polyester-2 (P-2): EASTAR Copolyester 15086 (Trademark of Eastman Chemical Company, USA) is a CHDM-modified PET resin comprising approximately 12 mol % of 1,4-cyclohexane dimethanol (CHDM) monomer units of its glycol component.

Polyester-3 (P-3): EASTAR Copolyester 6763 (Trademark of Eastman Chemical Company, USA) is a CHDM-modified PET polyester comprising approximately 31 mol % of CHDM monomer units of its glycol component.

Polyester-4 (P-4): EASTAR Copolyester 5445 (Trademark of Eastman Chemical Company, USA) is a CHDM-modified PET polyester comprising approximately 62 mol % of CHDM monomer units of its glycol component.

Polyester-5 (P-5): EASTAR A150 (Trademark of Eastman Chemical Company, USA) is a high-CHDM-modified PET polyester comprising approximately 17 mol % isophthalic acid of its total acid component and 100 mol % of CHDM of its total glycol component.

Polyester-6 (P-6): EASTAPAK PET (Trademark of Eastman Chemical Company, USA) and EASTAR Copolyester 6763 (Trademark of Eastman Chemical Company, USA) were mixed at a weight ratio of 50:50, dried at 66° C. for 24 hours and then melt-kneaded and extruded at 277° C. using a twin screw extruder, resulting in a blend comprising approximately 15 mol % CHDM of its total glycol component.

Ion-Containing Polyester-1 (IP-1): a modified-PET polyester comprising approximately 5.8 mol % of sodio-sulfoisophthalate (SIP) of its acid component and 6.7 wt % (of total polyester) of PEG in its glycol component. The number-average molecular weight of the PEG is 4000.

Ion-Containing Polyester-2 (IP-2): IP-1 and EASTAR Copolyester 6763 (Trademark of Eastman Chemical Company, USA) were mixed at a weight ratio of 82:18, dried at 66° C. for 24 hrs and then melt-kneaded and extruded at 277° C. using a twin screw extruder, resulting in a miscible polyester blend comprising approximately 5 mol % of CHDM in its glycol component.

Ion-Containing Polyester-3 (IP-3): a modified-PET polyester comprising approximately 5.8 mol % of SIP in its acid component and 10 mol % of CHDM and 6.7 wt % (of total polyester) of PEG in its glycol component. The molecular weight of the PEG is 4000.

Ion-Containing Polyester-4 (IP-4): a modified-PET polyester comprising approximately 5.8 mol % of SIP in its acid component and 10 mol % of CHDM and 6.7 wt % (of total polyester) of PEG in its glycol component. The number-average molecular weight of the PEG is 400.

Ion-Containing Polyester-5 (IP-5): a modified-PET polyester comprising approximately 5.8 mol % of SIP and 20 mol % of isophthalic acid in its acid component, and 6.7 wt % (of total polyester) of PEG and a balance of CHDM in its glycol component. The number-average molecular weight of the PEG is 400.

Polyester-7 (P-7): EASTAR Copolyester 5445 (Trademark of Eastman Chemical Company, USA) and IP-8 were blended at a ratio of 92:8 by weight, dried at 66° C. for 24 hrs and then melt-kneaded and extruded at 277° C. using a twin screw extruder, resulting in a polyester blend comprising approximately 57 mol % of CHDM monomer units in its glycol component.

Example 1

IP-2 and P-2 resins were used to form a two-layer film via a process of melt co-extrusion and biaxial stretching. The resins were extruded from two single-screw extruders through a sheet-forming co-extrusion die at about 280° C. The sheet was cast onto a cooling surface at about 60° C. to form a continuous two-layered cast sheet. After removal from the cooling surface the sheet was drafted and tentered at about 90° C. to about 3.4 times its original dimensions in the machine and transverse directions. The layer thicknesses of the multilayer film are listed in Table 1.

Example 2

The process of Example 1 was repeated except that IP-2 resin was co-extruded with P-4 resin to form a two-layered laminate. The polymer resins were extruded at about 280° C. The laminate was drafted and tentered at about 85° C. to about 3.4 times its original dimensions in the machine and transverse directions. The layer thicknesses of the multilayer film are listed in Table 1.

Example 3

The process of Example 1 was repeated except that IP-3 resin was co-extruded with P-4 resin to form a two-layered laminate. The polymers were extruded at about 280° C. The laminate was drafted and tentered at about 90° C. to about 3.4 times its original dimensions in the machine and transverse directions. The layer thicknesses of the multilayer film are listed in Table 1.

Example 4

The process of Example 1 was repeated except that IP-4 resin was co-extruded with P-2 resin to form a three-layered laminate The polymer resins were extruded at about 280° C. The laminate was drafted and tentered at about 90° C. to about 3.4 times its original dimensions in the machine and transverse directions. The layer thicknesses of the multilayer film are listed in Table 1.

Example 5

The process of Example 1 was repeated except that IP-4 resin was co-extruded with P-4 resin to form a three-layered laminate. The polymer resins were extruded at about 280° C. The laminate was drafted and tentered at about 90° C. to about 3.4 times its original dimensions in the machine and transverse directions. The layer thicknesses of the multilayer film are listed in Table 1.

Example 6

The process of Example 1 was repeated except that IP-4 resin was co-extruded with P-6 resin to form a three-layered laminate. The polymer resins were extruded at about 280° C. The laminate was drafted and tentered at about 90° C. to about 3.4 times its original dimensions in the machine and transverse directions. The layer thicknesses of the multilayer film are listed in Table 1.

Example 7

The process of Example 1 was repeated except that IP-4 resin was co-extruded with P-7 resin to form a three-layered laminate. The polymer resins were extruded at about 270° C. The laminate was drafted and tentered at about 90° C., to about 3.4 times its original dimensions in both the machine and transverse directions. The layer thicknesses of the multilayer film are listed in Table 1.

Example 8

The process of Example 1 was repeated except that IP-5 resin was co-extruded with P-5 resin to form a three-layered laminate. The polymer resins were extruded at about 270° C. The laminate was drafted and tentered at about 90° C. to about 3.4 times its original dimensions in the machine and transverse directions. The layer thicknesses of the multilayer film are listed in Table 1.

Comparative Example 9

The process of Example 1 was repeated except that P-1 resin was co-extruded with IP-1 resin to form a three-layered laminate. The polymer resins were extruded at about 280° C. and cast onto a cooling surface at about 60° C. to form a continuous two-layered cast sheet (laminate). The laminate was drafted and tentered at about 100° C. to about 3.4 times its original dimensions in the machine and transverse directions. The layer thicknesses of the multilayer film are listed in Table 1.

Comparative Example 10

P-1 resin was converted into film using the process of melt extrusion and biaxial stretching. The resin was extruded at about 280° C. through the sheet-forming co-extrusion die used in the above examples and cast onto a cooling surface at about 60° C. to form a continuous cast sheet with a homogeneous composition. The laminate was drafted and tentered at about 100° C. to about 3.4 times its original dimensions in both the machine and transverse directions.

Comparative Example 11

Comparative Example 11 is a conventional cellulose triacetate (CTA) film used as a support for traditional 35mm photographic elements. This film is traditionally manufactured by a solvent-casting process.

TABLE 1

| Example No | Polyester in outer layer(s) | Polyester in main layer | Layer thickness (μm) | | |
|---|---|---|---|---|---|
| | | | Outer layer-1 | Main layer | Outer layer-2 |
| 1 | IP-2 | P-2 | 39 | 70 | — |
| 2 | IP-2 | P-4 | 40 | 70 | — |
| 3 | IP-3 | P-4 | 36 | 79 | — |
| 4 | IP-4 | P-2 | 16 | 68 | 36 |
| 5 | IP-4 | P-4 | 16 | 70 | 34 |
| 6 | IP-4 | P-6 | 22 | 74 | 25 |
| 7 | IP-4 | P-7 | 20 | 69 | 31 |
| 8 | IP-5 | P-5 | 16 | 69 | 35 |
| Comparative 9 | IP-1 | P-1 | 15 | 70 | 35 |
| Comparative 10 | — | P-1 | — | 120 | — |
| Comparative 11 | — | CTA | — | 125 | — |

Physical Property Evaluation: The tensile toughness, tear resistance and post-process curl of the films prepared in the above examples were measured according to the following the procedures.

Tensile Toughness: All tests are performed in accordance with ASTM D 882-80a in a standard environment of 50% RH and 23° C. The tensile test is conducted using a Sintech®2 mechanical testing system with Testworks® version 4.5 software. The specimen size is 1.5 cm wide by 10.2 cm long (gauge length). The crosshead speed is 5.1 cm/min. Five specimens are tested per film sample. The reported tensile toughness is the area under the stress-strain curve.

Tear Strength: All tear tests are performed in accordance with ASTM D1938 in a standard environment of 50% RH and 23° C. The tear test is conducted using a Sintech®2 mechanical testing system with Testworks® version 4.5 software. The specimen size is 2.5 cm wide by 7.6 cm long. A 2.5 cm long cut is first made in the specimen at the center of the width using a pair of sharp scissors, creating two distinct arms. The arms are placed between two flat-faced grips of the mechanical test frame and stretched apart. The crosshead speed is 25 cm/min. The tear strength is reported by normalizing the average peak load by the thickness of the film.

Post-Process curl (PPC): This test evaluates the ability of the film to reduce curl during standard conditions encountered in typical minilab processors. The film is first stored in a wound state to acquire some level of core-set curl. For each of the films prepared in the examples of this invention, three lengthwise strips 75 mm×15 mm were cut and equilibrated at 21° C./50% RH for 16 hr. The strips were then wound on 10.8 mm dia. plastic cores and stored for 24 hrs in sealed bags at 55° C. After storage in a wound state, the films were unwound and their acquired core-set curl measured. The curled films were then processed in a NORITSU 450L minilab processor operated under standard conditions and the curl of the processed and dried films was read approximately one hour after processing. The average curl value measured at this stage is the reported post-process curl (PPC). The curl measurements in this test follow Test Method A in ANSI P41.29-1985.

The key properties of the test films prepared in the examples of the present invention are listed in Table 2 below. The cutting index was determined according to Equation 2 above.

TABLE 2

| Example No | Polyester in outer layer | Polyester in main layer | Tensile toughness (MPa) | Tear strength (g/100 μm) | Cutting index | PPC (l/m) |
|---|---|---|---|---|---|---|
| 1 | IP-2 | P-2 | 95 | 44 | 2.9 | 82 |
| 2 | IP-2 | P-4 | 43 | 38 | 1.7 | 59 |
| 3 | IP-3 | P-4 | 46 | 24 | 1.5 | 68 |
| 4 | IP-4 | P-2 | 73 | 50 | 2.6 | 26 |
| 5 | IP-4 | P-4 | 41 | 47 | 1.8 | 25 |
| 6 | IP-4 | P-6 | 94 | 31 | 2.7 | 66 |
| 7 | IP-4 | P-7 | 64 | 44 | 2.3 | 72 |
| 8 | IP-5 | P-5 | 21 | 24 | 0.9 | 16 |
| Comparative 9 | IP-1 | P-1 | 160 | 107 | 5.6 | 64 |
| Comparative 10 | — | P-1 | 131 | 81 | 4.5 | 108 |
| Comparative 11 | — | CTA | 23 | 25 | 1.0 | 28 |

As shown in Table 2, the film samples of Comparative Examples 9 and 10 are expected to have poor cutting performance in various photofinishing operations because of their high cutting index. By contrast, the film samples of Example 1–8 comprising CHDM-modified polyester material are expected to have improved cutting performance since the corresponding cutting index is comparatively lower. In addition, by using copolyesters containing SIP and PEG it is possible to achieve sufficiently low levels of PPC in comparison to polyester film samples where these moieties are not present (e.g., Comparative Example 10). With a relatively high PPC the film is likely to have difficulty transporting in various types of photofinishing equipment such as printers, sleevers, autopackers and the like.

The invention has been described in detail with particular reference to certain preferred embodiments thereof, but it will be understood that variations and modifications can be effected within the spirit and scope of the invention.

What is claimed is:

1. A biaxially stretched, semicrystalline multilayer polyester photographic film base having at least two layers with the thickness of each layer being equal to or greater than 10 μm, said film base comprising:

a) a main layer of a first PET-based polyester material, comprising one or more polyester resins, in which the total level of repeat units derived from 1,4-cyclohexane dimethanol is 2 to 100 mol %, based on the total glycol component in the main layer;

b) an outer layer of a second PET-based polyester material, which outer layer comprises one or more polyester resins, in which material:
        the total level of repeat units derived from 1,4-cyclohexane dimethanol is 2 to 100 mol %, based on the total glycol component in the material;
        the total level of repeat units that is a salt of a sulfonic-acid-substituted aromatic dicarboxylate is between 2 and 10 mol % based on the total acid component in the material; and
        the total level of repeat units that is a polyalkylene glycol having an average molecular weight of 300 to 20,000 is between 3 and 10 wt % of the total polyester;
        wherein at least the polyester material in the outer layer is a semicrystalline polyester; and
        wherein the cutting index of said multilayer film base is less than 4.2 and the post process curl of said multilayer film base is less than 85 l/m.

2. A biaxially stretched, semicrystalline polyester photographic film base comprising at least three layers with the thickness of each layer being equal to or greater than 10 μm, which film base comprises:

a) a main layer of a first PET-based polyester material comprising one or more polyester resins, in which the total level of repeat units derived from 1,4-cyclohexane dimethanol is 2 to 100 mol %, based on the total glycol component in the main layer;

b) a first and a second outer layer of a second and third PET-based polyester material on both sides of the main layer comprising one or more polyester resins, in which second and third PET-based polyester material independently comprises a material in which:
        the total level of repeat units derived from 1,4-cyclohexane dimethanol is 2 to 100 mol %, based on the total glycol component in the polyester material;
        the total level of repeat units that is a salt of a sulfonic-acid-substituted aromatic dicarboxylate is between 2 and 10 mol % based on the total acid component in the material; and
        the total level of repeat units that is a polyalkylene glycol having an average molecular weight of from 300 to 20000 is between 3 and 10 wt % of the total polyester;
        wherein at least the polyester material in the outer layers is a semicrystalline polyester; and
        wherein the cutting index of said multilayer film base is less than 4.2 and the post-process curl of said multilayer film base is less than 85 l/m.

3. The film base of claim 1 or 2 wherein the total thickness of said film base is 50 to 180 μm.

4. The film base of claim 1 or 2 wherein one or more tie layers are present, each such tie layer being located between two adjacent support layers in the multilayer film base.

5. The film base of claim 1 or 2 wherein said first PET-based material comprises one or more polyester resins, in which material the total level of repeat units derived from 1,4-cyclohexane dimethanol is 2 to 20 or 65 to 100 mol %, based on the total glycol component for material in the main layer.

6. The film base of claim 1 or 2 wherein said second PET-based polyester material further comprises, in copolymerized form, the following:

a glycol selected from the group consisting of propylene glycol, butanediol, neopentyl glycol, diethylene glycol, triethylene glycol, p-xylene glycol, and combinations thereof; and an aromatic dicarboxylic acid selected from the group consisting of 2,6-naphthalenedicarboxylic acid (NDA), isophthalic acid (IPA), orthophthalic acid (OPA), cyclohexane dicarboxylic acid (CHDA) or paraphenylene dicarboxylic acid (PPDA), and combinations thereof.

7. The film base of claim 1 or 2, wherein said sulfonic-acid substituted aromatic dicarboxylic acid is selected from the group consisting of terephthalic acid (TPA), isophthalic acid (IPA), and 2,6-naphthalenedicarboxylic acid (NDA), wherein said TPA, said IPA, and said NDA has a metal sulfonate group; or said aromatic dicarboxylic acid is selected from the group consisting of:

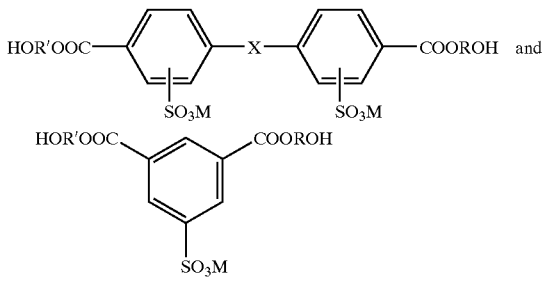

wherein X represents:

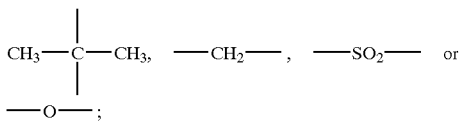

R and R' each represent —(CH$_2$)$_n$— where n represents an integer of 1 to 20; and M represents sodium, potassium or lithium ions; and, wherein said polyalkylene glycol is selected from the group consisting of a polyethylene glycol, polypropylene glycol, polytetramethylene glycol; and combinations thereof.

8. The film base of claim 1 wherein said sulfonated aromatic dicarboxylic acid is selected from the group consisting of 5-sodium sulfoisophthalic acid, 2-sodium sulfoisophthalic acid, 4-sodium sulfoisophthalic acid, 4-sodium sulfo-2,6-naphthalene dicarboxylic acid, an ester-forming derivative thereof, a compound in which each of these sodiums is substituted by another metal, and combinations thereof.

9. The film base of claim 1 wherein said polyalkylene glycol is polyethylene glycol.

10. The film base of claim 1 wherein the first and/or the second polyester materials comprise a miscible blend of at least two polyesters.

11. The film base of claim 1 wherein said second PET-based material comprises one or more polyester resins, in which material the total level of repeat units derived from 1,4-cyclohexane dimethanol is 5 to 10 or 90 to 100 mol %, based on the total glycol component for material in the outer layer.

12. The film base of claim 1 wherein said second PET-based material comprises one or more polyester resins, in which material the total level of repeat units derived from said salt of a sulfonic-acid-substituted aromatic dicarboxylate is 4 to 8 mol %, based on the total acid component for material in the outer layer.

13. The film base of claim 1 wherein said second PET-based material comprises one or more polyester resins, in which material the total level of repeat units derived from said polyalkylene glycol is 5 to 10 wt %, based on the total polyester material in the outer layer.

14. The film base of claim 1 wherein said second PET-based material comprises one or more polyester resins, in which material the polyalkylene glycol is polyethylene glycol and its number-average molecular weight is from 400 to 6000.

15. The film base of claim 2 wherein the ratio of the thickness of the main layer to the sum of the outer layers is 0.5 to 10.

16. The film base of claim 1 wherein said first PET-based polyester material comprises a blend of at least two polyesters, a first polyester being a CHDM-modified PET polyester in which material the level of CHDM-comonomer units is 25 to 35 mol % based on the total glycol component, and a second polyester being PET, wherein the total repeat units derived from 1,4-cyclohexane dimethanol in the PET-based polyester material is at a level of 10 to 15 mol % based on the total glycol component in the polyester material.

17. The film base of claim 1 wherein said first polyester material comprises 100% of CHDM-monomer, based on the glycol component in said polyester.

18. The film base of claim 1 or 2 wherein the film base has a cutting index of less than 3.5.

19. The film base of claim 1 wherein the film base is manufactured by a process of melt extrusion, casting, biaxial stretching and heat-setting.

20. An imaging element comprising at least one light-sensitive or heat-sensitive imaging layer laminated on the film base of claim 1 wherein the imaging layer comprises a silver-halide emulsion.

21. An imaging element comprising at least one light-sensitive or heat-sensitive imaging layer laminated on the film base of claim 2 wherein the imaging layer comprises a silver-halide emulsion.

22. The imaging element of claim 20 wherein the imaging layer is sensitive to X-ray exposure or to exposure of emissions from a phosphor screen.

23. The imaging element of claim 20 wherein the element is a photographic film or a photothermographic film.

24. The imaging element of claim 20 wherein the element is a 35 mm photographic film.

25. The imaging element of claim 20 further comprising a photographically acceptable subbing layer and backing layers applied onto the film base.

26. The imaging element of claim 20 wherein the film base bears a magnetic or optical recording layer.

* * * * *